Dec. 21, 1948.　　　　C. H. SCHLESMAN　　　　2,457,091
GELATION PROCESS INVOLVING SUPERSONIC TREATMENT
Filed April 9, 1947　　　　　　　　　　2 Sheets-Sheet 2

INVENTOR
CARLETON H. SCHLESMAN
BY Oswald G. Hayes
ATTORNEY

Patented Dec. 21, 1948

2,457,091

UNITED STATES PATENT OFFICE 2,457,091

GELATION PROCESS INVOLVING SUPERSONIC TREATMENT

Carleton H. Schlesman, Allentown, Pa., assignor to Socony-Vacuum Oil Company, Incorporated, a corporation of New York Application April 9, 1947, Serial No. 740,297

5 Claims. (Cl. 252—317)

1

This invention relates to a process for the preparation of inorganic oxide hydrogels and the dry porous adsorptive products derived by removal of water from the hydrogels. More particularly the invention relates to modification of the gel structure by subjecting a gelable hydrosol to the influence of supersonic waves during gelation.

Many of the inorganic oxides capable of existing in the hydrated and/or hydrous form are capable of forming self-sustaining colloids with water which colloids are generaly known as hydrogels. Hydrogels are to be distinguished from gelatinous precipitates formed by precipitation under conditions which result in formless, slimy masses which separate from the aqueous liquid in which they are formed. By way of contrast, a hydrogel is formed when precipitation occurs under conditions favorable to the development of an interlocking lattice formed of the solid inorganic oxide which retains within its pores all of the liquid phase. Typically the hydrogels are formed from hydrosols which are liquid colloids containing the inorganic oxide in a fine state of dispersion.

Many of the gelable hydrosols are characterized by a more or less definite gelation time. Thus, a hydrosol of silica or combined hydrosols of silica with such metallic oxides as alumina, zirconia, beryllia and the like will gradually become more viscous on standing until they reach a stage at which they will no longer flow and are capable of being broken but will not reunite to form a single homogeneous mass as will the liquid hydrosol. Other hydrosols, notably many of the alumina hydrosols, are relatively stable and must be subjected to some chemical action to induce gelation.

This invention relates to the treatment of those materials which form true hydrogels regardless of whether the gelation occurs as a result of the passage of time or is chemically induced. It is well known that the character of the hydrogel may be modified with respect to its physical properties by any one of several types of treatment of the hydrogel. The important properties of these gels, after drying, are size of the pores and surface area provided by the extremely porous nature of the dried gel. It is known that the diameter of the pores, the total pore volume and the total surface area exposed may be concurrently increased by such treatments as soaking a fresh hydrogel in hot water before the same is washed free of soluble impurities and/or zeolitic alkali metals. These increases are accompanied by a decrease in the

2 property known as particle density, i. e., the volume of the particle divided by the weight of the particle, usually determined by displacement of mercury. Other factors, such as pH of the liquids used to wash the hydrogel and the temperature and duration of treatment during drying and activation also affect the physical properties of the finished dried gel. These treatments appear to act by controlling the degree of shrinkage of the gel on drying and activation. Thus, the quantity and general arrangement of the pores would seem to be fixed at the time of gelation, but the size of the pores, the total pore volume and the total surface area exposed may be controlled by factors affecting the degree of shrinkage of the solid skeleton.

It has now been found that hydrogels may be formed under conditions which affect the physical properties noted above in a manner which can be explained only on the hypothesis that the number and arrangement of the pores is subjected to control. Thus, in a typical example described hereinafter, the surface area is increased concurrently with a decrease in particle density and pore volume. This alteration in properties of the dried gel clearly indicates that the number of pores is increased by the treatment to which this invention is directed. The invention therefore provides a further means for control of the properties of dried gels which may be used alone or in combination with previously known types of treatment to prepare a gel "tailor made" to any desired need.

The importance of pore diameters, pore volumes, particle density and surface area have been heretofore recognized in the art and will require only brief review here. Particle density is a highly important factor where the gel is to be contacted with a fluid in that the particle density determines the critical flow rates for the fluid to cause or prevent suspension of the gel as may be required by the process in which it is used. The size of the pores in dried gels approaches molecular dimensions and has an important effect on rates of diffusion of a fluid in contact with the gel. Pore volume and total surface area exposed determine the amount of fluid which can be within the pores of the gel at any given time and the amount of surface exposed for adsorptive or catalytic effect.

According to the present invention the above noted advantageous results are obtained by subjecting a hydrosol to supersonic vibrations at the time of gelation. Intensity (amplitude), frequency and duration of the treatment may be varied as desired to produce greater or lesser effects on the gel structure. In general, it is preferred that the waves be transmitted through a fluid medium which should be immiscible with the hydrosol in order that it shall not chemically affect either the sol or the gel. In some cases it may be found desirable to use liquid transmission media in the nature of aqueous solutions, including chemical agents having an effect on the sol or gel, but in such cases controls must be exercised to avoid extensive dilution of the hydrosol prior to gelation. Thus, aqueous ammonia may be employed for its accelerating effect on gelation. In such cases, the sol should be brought in contact with the ammonia in a highly viscous state in order to prevent extensive dilution.

The supersonic waves may be generated in any suitable manner such as magneto-striction, or by the use of piezo-electric effects. The invention is well illustrated by reference to the annexed drawings showing an apparatus for making bead catalyst and utilizing supersonic waves for their modifying effect on the gel. In the drawings.

Figure 1:
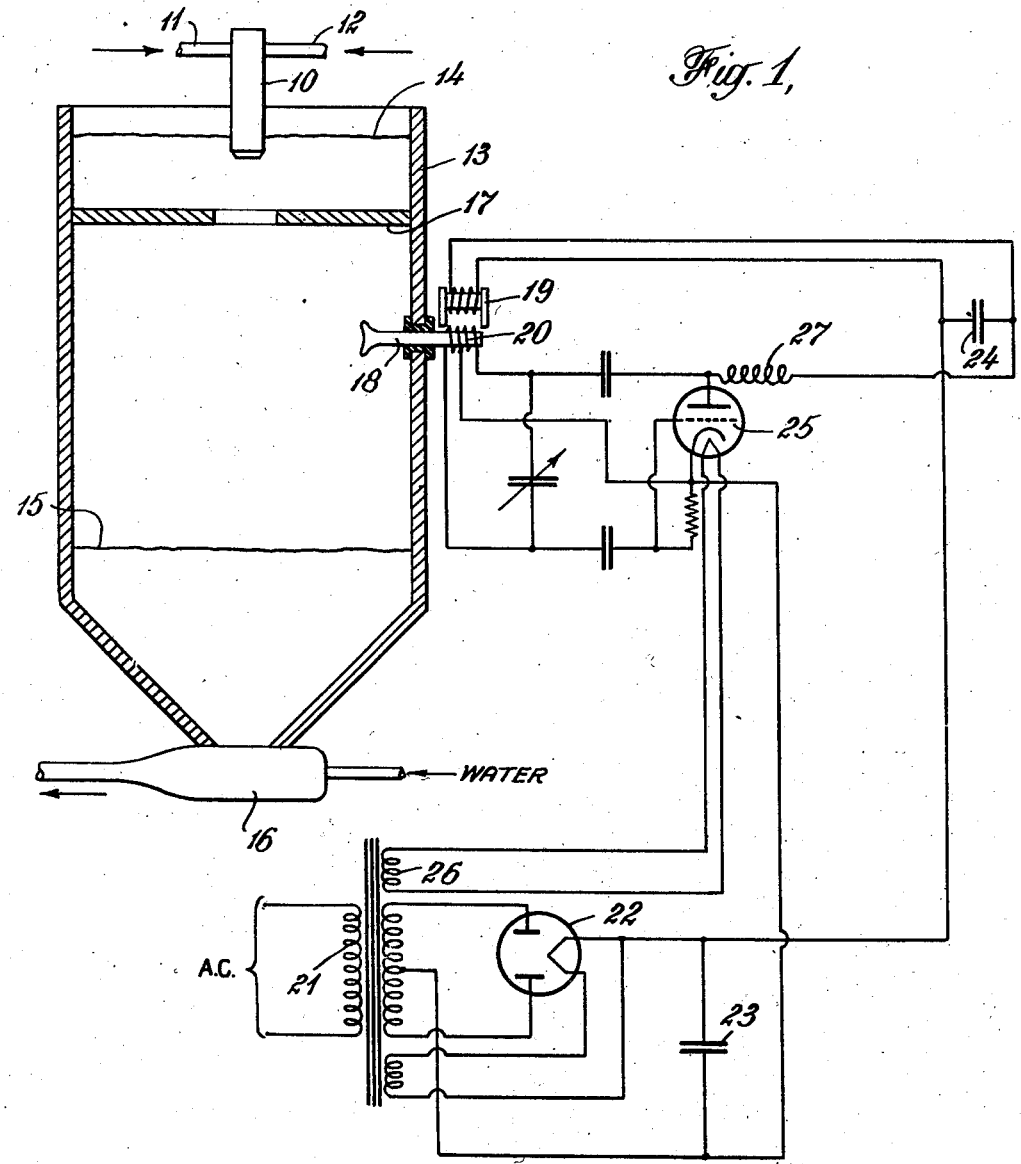
Figure 1 illustrates apparatus for utilizing a magneto-strictive device.

The general principles of the bead catalyst process are set out in Marisic Patent No. 2,384,946 issued September 18, 1945, and need not be reviewed here. According to the process shown in Figure 1, a gelable hydrosol is formed in a mixing nozzle 10 from suitable aqueous solutions supplied at controlled rates by lines 11 and 12. The resulting sol is introduced to a body of oil such as a light gas oil confined within a vertical chamber 13, the upper surface of the oil being indicated at 14. The sol separates into globules in the oil and falls through the oil column which is of such height that the sol will set to a firm hydrogel before it reaches an interface 15 representing the upper surface of a layer of water in the bottom of chamber 13. The firm globules of hydrogel fall to the bottom of the chamber and are picked up in a stream of water passed through an injector 16 and thus removed from the apparatus for further processing including washing and drying. This basic bead apparatus is modified according to the present invention by insertion into the oil body of means for generating supersonic vibrations within the oil column. It is often found desirable to inhibit transmission of these vibrations to the point of injection of the hydrosol and a baffle 17 may be inserted for that purpose. In the specific apparatus shown in the drawing, the supersonic waves are generated by a transducer 18 which consists of a hollow cylinder of nickel supported at an antinode in the wall of chamber 13 as shown. Means for inducing vibrations in the transducer 18 are shown outside the chamber 13. These comprise a D. C. field coil 19 and an induction coil 20 about the end of transducer 18 to which is supplied an alternating current corresponding to the frequency of the supersonic waves desired.

A typical circuit is shown for the above purpose, but it is to be understood that the same is not limiting of the invention, but is rather illustrative in nature. The circuit consists of a source of power and a simple feed back oscillator. It will be understood that in general one or more amplification stages may be desired between the oscillator circuit and the coil 20, but these are conventional in the art and are omitted to simplify the showing.

A suitable alternating current is supplied to primary winding 21 of a transformer which serves to supply all of the power for the system. The circuit includes a rather conventional full wave rectifier embodying a tube 22 which may be type 866–A or any other suitable type. In the setup shown, field coil 19 acts as a choke in the power supply for the oscillating circuit furnishing coil 20. The peaks in the output of the rectifier tube 22 are smoothed by the action of coil 19 and condensers 23 and 24.

The oscillating circuit is a quite conventional feed back arrangement including any suitable triode tube 25 (such as type 816), the three leads from coil 20 serving to furnish the inductive coupling for self-excitation of the oscillating circuit. As shown, the filament of tube 25 is heated from secondary winding 26 of the transformer. In conventional manner a radio frequency choke 27 is inserted in the power lead to the plate of tube 25.

Figure 2:
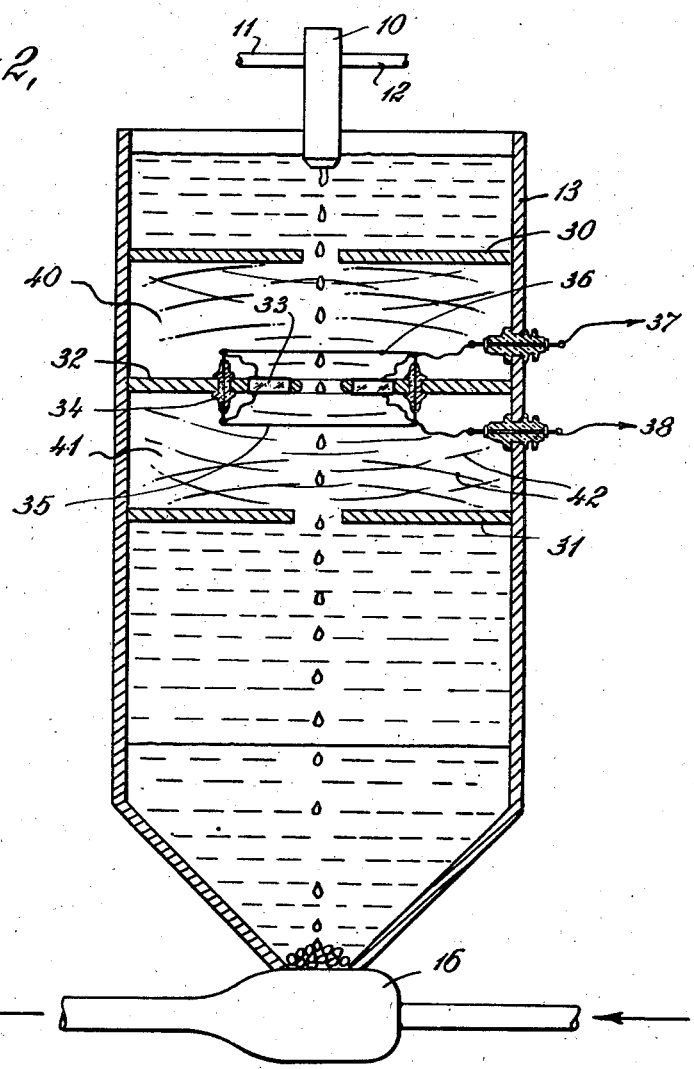
Figure 2 illustrates apparatus employing piezo-electric crystals.

The apparatus of Figure 2 resembles that of Figure 1 in including the elements for forming bead gels; namely, a vessel 13 having a mixing nozzle 10 at its upper end and an injector 16 at the bottom for removal of bead hydrogel. The means for imparting supersonic vibrations to the oil column embody upper and lower baffles 30 and 31 and a central diaphragm 32 therebetween supporting cylindrical quartz crystals 33 and acting as an acoustic baffle to prevent waves propagated on different sides of the diaphragm 32 from cancelling each other. The baffles 30 and 31 and the diaphragm 32 are provided with central apertures as shown to provide a path through which the gelling globules may pass. Insulators 34 mounted on diaphragm 32 carry conductors 35 and 36 surrounding the aperture in diaphragm 32. High frequency current at high voltage is supplied to conductors 35 and 36 by leads 37 and 38 connected to a source of oscillating current such as that shown in Figure 1. Direct waves produced by mechanical oscillation of crystals 33 and reflected waves from baffles 30 and 31 are indicated generally at 42 in chambers 40 and 41, respectively above and below diaphragm 32.

Figure 3:
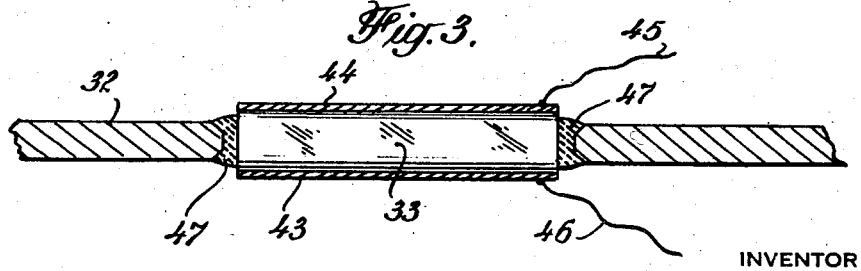
Figure 3 is a detail view in section showing the mounting of the crystals in the apparatus of Figure 2.

As shown in the detail section of Figure 3, the cylindrical quartz crystals 33 are mounted in the diaphragm 32 in any suitable arrangement; for example, six crystals 33 may be symmetrically arranged about the aperture in the diaphragm. Metal electrodes 43 and 44 are connected to conductors 35 and 36 by leads 45 and 46. The crystals may be advantageously held in place in diaphragm 32 by cementing with a suitable plastic at 47.

*Example I*

In a typical use of the types of apparatus shown in the drawings, two reactant sols are made up containing sodium silicate and aluminum sulfate. The sodium silicate solution is made by mixing 4.06 lbs. of "N" brand sodium silicate solution with 5.35 lbs. of water to give 1 gallon of solution have a specific gravity of 1.148. The other solution is prepared by dissolving 0.518 lb. of aluminum sulfate $(Al_2(SO_4)_3 \cdot 18H_2O)$ and 0.25 lb. of 100% sulphuric acid in sufficient water to form 1 gallon of solution containing 92% water, 6% aluminum sulfate and 2% sulphuric acid. These two solutions are continuously mixed in the nozzle mixer to yield a sol having a pH of about 8 and a silica-to-alumina ratio of 93 to 7. The gelation time for this sol is about 5 seconds. Both sol and oil are maintained at about 70 to 80° F. Under the influence of supersonic waves having a frequency of about 40,000 cycles per second, there is produced a bead hydrogel which, after washing, base exchanging, drying and tempering, is an excellent catalyst for the catalytic cracking of low molecular weight hydrocarbons.

Example II

Two batches of gel were prepared from a single batch of sol in batch fashion to permit strict comparison to show the effect of supersonic waves during gelation. The sol was prepared by adding diluted sodium silicate solution to an acidified solution of aluminum sulfate to give a sol containing 4 gr. of solid oxides per 100 cc. at a pH of 8.6. The silica-alumina ratio was 93 to 7. The sol was divided into two portions immediately after preparation, one portion being allowed to set normally, while the other set in a bath of gas oil to which was applied a supersonic vibration of 50,000 cycles per second. Both portions set in about 5 minutes (at 35° F.) and both were thereafter washed for removal of soluble salts, base exchanged with aluminum sulfate to remove zeolitic sodium and dried in identical manner. The properties of the two gels are shown by the following table:

| Gel | Surface Area [1] sq. m./g. | Density, gm/cc. | | Pore Volume,[4] cc./gm. | Pore Diam.[5] A° |
|---|---|---|---|---|---|
| | | Particle[2] | Real[3] | | |
| Blank | 452 | 1.225 | 2.395 | 0.400 | 35 |
| Supersonic vibration. | 497 | 1.323 | 2.406 | 0.340 | 27 |

[1] Determined by low-temperature nitrogen adsorption.
[2] Determined by displacement of mercury.
[3] Determined by displacement of helium.
[4] Calculated from the particle and real densities.
[5] Average diameter of pores, assuming cylindrical shape.

Other gels known to the art may also be prepared according to the present invention using supersonic waves of any desired frequency and amplitude. Care should, of course, be exercised to avoid such intense vibration as to cause mechanical disruption of the gel. It may be noted that alumina beads are advantageously prepared by injecting alumina hydrosol into a body of oil overlying aqueous ammonia. The alumina sol assumes generally spherical shape in the body of oil and is set to a firm hydrogel upon passing through the interface into the ammonia layer.

I claim:

1. In a process of forming inorganic oxide hydrogels from inorganic oxide hydrosols capable of setting to hydrogels by forming a hydrosol and injecting said hydrosol into a water immiscible liquid as a plurality of globules, the improvement which comprises subjecting said liquid to supersonic vibrations during gelation of said hydrosol.

2. In a process of forming inorganic oxide hydrogels from inorganic oxide hydrosols capable of setting to hydrogels by immersing a hydrosol in a water immiscible liquid, the improvement which comprises subjecting said liquid to supersonic vibrations during gelation of said hydrosol.

3. In a process of forming inorganic oxide hydrogels from inorganic oxide hydrosols comprising silica and alumina, the improvement which comprises subjecting a hydrosol capable of setting to a hydrogel comprising silica and alumina to supersonic vibrations during gelation.

4. In a process of forming inorganic oxide hydrogels from inorganic oxide hydrosols comprising silica, the improvement which comprises subjecting a hydrosol capable of setting to a hydrogel comprising silica to supersonic vibrations during gelation.

5. In a process of forming inorganic oxide hydrogels from inorganic oxide hydrosols, the improvement which comprises subjecting a hydrosol capable of setting to a hydrogel to supersonic vibrations during gelation.

CARLETON H. SCHLESMAN.

No references cited.